United States Patent
Noble et al.

(10) Patent No.: US 11,062,315 B2
(45) Date of Patent: Jul. 13, 2021

(54) FRAUD AS A SERVICE

(71) Applicant: AT&T INTELLECTUAL PROPERTY I, L.P., Atlanta, GA (US)

(72) Inventors: Eric Noble, Quartz Hill, CA (US); Di Chou, Colts Neck, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 177 days.

(21) Appl. No.: 15/962,253

(22) Filed: Apr. 25, 2018

(65) Prior Publication Data
US 2019/0333069 A1    Oct. 31, 2019

(51) Int. Cl.
*G06Q 20/40* (2012.01)
*G06Q 30/06* (2012.01)
*G06Q 20/42* (2012.01)

(52) U.S. Cl.
CPC ....... *G06Q 20/4016* (2013.01); *G06Q 20/405* (2013.01); *G06Q 20/4014* (2013.01); *G06Q 20/42* (2013.01); *G06Q 30/06* (2013.01)

(58) Field of Classification Search
CPC .............. G06Q 20/4016; G06Q 40/02; G06Q 30/0185; G06Q 40/00; G06Q 20/10; G06Q 20/382; G06Q 20/40; G06Q 30/00; G06Q 10/10; G06Q 20/04; G06Q 20/401; G06Q 2220/00; G06Q 40/04; G06Q 40/06; H04L 7/1031; H04L 67/16; Y04S 10/54; G06F 8/60
USPC ................ 705/7.29, 16, 35, 38, 39, 44, 318; 348/150; 706/47
See application file for complete search history.

(56) References Cited

U.S. PATENT DOCUMENTS

| 6,601,048 B1 | 7/2003 | Gavan et al. |
| 8,280,833 B2 | 10/2012 | Miltonberger |
| 9,369,406 B2 | 6/2016 | Thomas et al. |

(Continued)

FOREIGN PATENT DOCUMENTS

| AU | 200027810 | 6/2000 |
| WO | 0067460 | 11/2000 |

(Continued)

OTHER PUBLICATIONS

Bucchiarone, et al. "From Monolithic to Microservices: An experience report." (2017), 5 pages.

(Continued)

*Primary Examiner* — Alexander G Kalinowski
*Assistant Examiner* — Sanjeev Malhotra
(74) *Attorney, Agent, or Firm* — Amin, Turocy & Watson, LLP

(57) ABSTRACT

Various embodiments disclosed herein provide for a fraud detection as a service system that can be implemented via one or more microservices that can be instantiated on an operation support system and/or business support systems. Each fraud detection microservice instantiated can have one or more fraud detection models and sets of rules for a particular type of incoming data stream or transaction and/or interaction data. In this way, there can be more than one fraud detection microservice operating on the OSS/BSS allowing each fraud detection microservice to be dynamically updated in real time, provide continuous integration and continuous delivery of services, and work with a particular data flow, providing for an optimal fraud detection process.

20 Claims, 11 Drawing Sheets

(56) References Cited

U.S. PATENT DOCUMENTS

| | | |
|---|---|---|
| 9,509,782 B2 | 11/2016 | Lawson et al. |
| 9,542,708 B2 | 1/2017 | Piper et al. |
| 9,563,599 B2 | 2/2017 | Follett et al. |
| 9,699,660 B1 | 7/2017 | Blatt et al. |
| 9,716,617 B1 | 7/2017 | Ahuja et al. |
| 9,832,646 B2 | 11/2017 | Richards et al. |
| 9,838,376 B1 | 12/2017 | Lander et al. |
| 9,942,254 B1 | 4/2018 | Averbuch et al. |
| 2007/0112574 A1 | 5/2007 | Greene |
| 2008/0046334 A1* | 2/2008 | Lee .................. G06Q 20/4016 705/318 |
| 2008/0162396 A1* | 7/2008 | Kerley .................. G06N 5/025 706/47 |
| 2009/0164761 A1 | 6/2009 | Bolt et al. |
| 2011/0251976 A1 | 10/2011 | Thatthachar et al. |
| 2011/0276489 A1* | 11/2011 | Larkin .................. G06Q 20/42 705/44 |
| 2012/0099711 A1 | 4/2012 | Tully et al. |
| 2012/0101930 A1* | 4/2012 | Li ........................ G06Q 40/02 705/35 |
| 2013/0013512 A1 | 1/2013 | Cloud et al. |
| 2013/0024300 A1* | 1/2013 | Choudhuri ........... G06Q 30/018 705/16 |
| 2013/0024339 A1* | 1/2013 | Choudhuri ......... G06Q 30/0185 705/35 |
| 2013/0024358 A1* | 1/2013 | Choudhuri ......... G06Q 20/4016 705/38 |
| 2013/0024361 A1* | 1/2013 | Choudhuri ............ G06Q 40/02 705/39 |
| 2013/0024375 A1* | 1/2013 | Choudhuri ......... G06Q 20/4016 705/44 |
| 2013/0024376 A1* | 1/2013 | Choudhuri ......... G06Q 20/4016 705/44 |
| 2014/0012724 A1* | 1/2014 | O'leary ............. G06Q 20/4016 705/35 |
| 2014/0089193 A1* | 3/2014 | Boding .................. G06Q 30/06 705/44 |
| 2014/0108234 A1* | 4/2014 | Mayerle ................. G06Q 10/10 705/39 |
| 2014/0114840 A1* | 4/2014 | Arnold ............. G06Q 20/4016 705/39 |
| 2015/0046216 A1* | 2/2015 | Adjaoute ........... G06Q 30/0201 705/7.29 |
| 2015/0170147 A1* | 6/2015 | Geckle .................. G06Q 40/02 705/44 |
| 2016/0034766 A1* | 2/2016 | Bobbitt .............. G06K 9/00771 348/150 |
| 2016/0203490 A1* | 7/2016 | Gupta ................ G06Q 20/4016 705/44 |
| 2016/0364794 A1* | 12/2016 | Chari ..................... G06Q 40/02 |
| 2017/0012941 A1 | 1/2017 | Subbarayan et al. |
| 2017/0053291 A1 | 2/2017 | Chodhari et al. |
| 2017/0140382 A1* | 5/2017 | Chari ................... G06Q 20/389 |
| 2017/0147417 A1 | 5/2017 | Sasturkar et al. |
| 2017/0148024 A1* | 5/2017 | Yu ...................... G06Q 20/4016 |
| 2017/0148025 A1* | 5/2017 | Le .......................... G06Q 20/401 |
| 2017/0148027 A1* | 5/2017 | Yu ...................... G06Q 10/0635 |
| 2017/0278186 A1* | 9/2017 | Creighton, IV ..... G06Q 20/401 |
| 2017/0359217 A1* | 12/2017 | Ahuja ..................... G06F 21/554 |
| 2018/0034779 A1* | 2/2018 | Ahuja ............... G06F 16/90344 |
| 2018/0034839 A1 | 2/2018 | Ahuja et al. |
| 2018/0089011 A1* | 3/2018 | Basiri ..................... G06F 9/5077 |
| 2018/0107586 A1* | 4/2018 | Vyas ........................ G06F 11/14 |
| 2018/0113707 A1* | 4/2018 | Mora Lopez ......... G06F 9/3013 |
| 2018/0150843 A1* | 5/2018 | Adjaoute ................. G06N 5/04 |
| 2018/0191503 A1* | 7/2018 | Alwar .................... H04L 9/0637 |
| 2018/0197288 A1* | 7/2018 | Nunes .................... A61B 6/502 |
| 2018/0276683 A1* | 9/2018 | Calzaretta ............ G06F 40/205 |
| 2019/0057398 A1* | 2/2019 | Shukla .................. G06F 16/955 |
| 2019/0104184 A1* | 4/2019 | Gao ........................ H04L 67/16 |
| 2019/0220289 A1* | 7/2019 | Driesen ............... G06F 9/44505 |
| 2019/0235993 A1* | 8/2019 | Modeel ..................... G06F 8/60 |

FOREIGN PATENT DOCUMENTS

| | | |
|---|---|---|
| WO | 2013174416 | 11/2013 |
| WO | 2018065629 | 4/2018 |

OTHER PUBLICATIONS

Hole, "Anomaly detection with htm." Anti-fragile ICT Systems, Springer, Cham, 2016. 8 pages.

Kuncheva, "Change detection in streaming multivariate data using likelihood detectors." IEEE Transactions on Knowledge and Data Engineering 25.5 (2013), 8 pages.

Dal Pozzolo, et al. "Learned lessons in credit card fraud detection from a practitioner perspective." Expert systems with applications 4110 (2014), 32 pages.

Stopford, "Microservices: Building a Microservices Ecosystem with Kafka Streams and KSQL," confluent, confluent.io, 2017, 20 pages.

Dunning, Ted, "A Better Way to Build a Fraud Detector: Streaming Data and Microservices Architecture," MAPR®, mapr.com, 2017, 10 pages.

* cited by examiner

FRAUD AS A SERVICE

TECHNICAL FIELD

The present application relates generally to the fraud detection and more particularly to fraud detection as a service implemented by distributed microservices.

BACKGROUND

Typically, fraud detection, prevention and remediation systems are monolithic and isolated, and their interfaces with other operation support systems (OSS) and business support systems (BSS) are serialized and are unable to provide continuous integration and continuous delivery.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
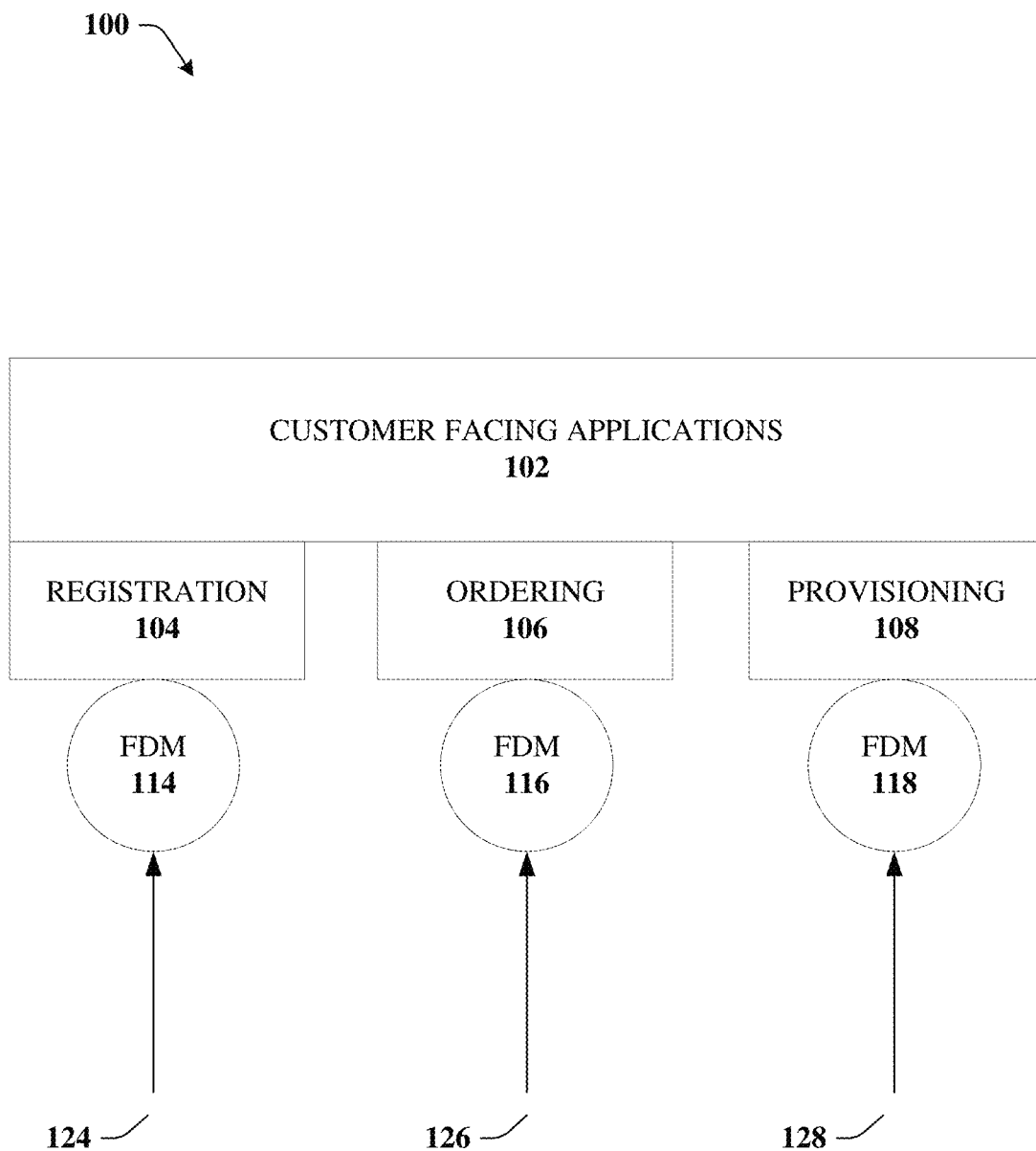
FIG. 1 illustrates an example fraud detection microservices system that monitors for fraud in incoming data streams in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

Various embodiments disclosed herein provide for a fraud detection as a service system that can be implemented via one or more microservices that can be instantiated on an operation support system and/or business support systems. Each fraud detection microservice instantiated can have one or more specific fraud detection models and a set of rules for a particular type of incoming data stream or transaction and/or interaction data. In this way, there can be more than one fraud detection microservice operating on the OSS/BSS allowing each fraud detection microservice to be dynamically updated in real time, provide continuous integration and continuous delivery of services, and work with a particular data flow, providing for an optimal fraud detection process. Each fraud detection microservice instantiated can be operable to monitor for fraud on one or more data streams, both external and internally originating. Similarly, in some embodiments, one or more fraud detection microservices, with similar or different fraud detection models and rules can be operable to monitor for fraud on the same data stream. The fraud detection microservices can work in parallel with each other, interacting and communicating in their respective roles.

Traditional systems fraud detection systems are monolithic and their interfaces with other OSSs and BSSs are serialized, far apart from the goal of Continuous Integration (CI) and Continuous Delivery (CD). Furthermore, the traditional commercial fraud systems have done little to move their products towards microservices oriented API driven architecture. Often their upper stream and downstream systems are not real-time, and their analytics models are pre-determined, programmed, and deployed independently with the dynamical changes of OSSs/BSSs that use them. Their data entities have pre-defined and fixed formats, and usually requires traditional Relational DBMSs. These legacy architecture characteristics often impede the feature velocity requirements of today's fraud detection and prevention.

By contrast, in the fraud detection system disclosed herein, intelligent agile microservices can be developed to augment or replace the monolithic fraud detection applications. This enables the fraud detection as a service system to instantiate extensions to existing business logic at crucial junctions in existing and future business process landscapes, thus reducing or eliminating the necessity of creating data feeds into a monolithic fraud architecture in order to detect fraud and otherwise unprofitable transactions. This solution also provides the same capabilities for external customers: Fraud as a Service will be available to augment or replace monolith solutions in customer networks.

By enabling fraud rule based microservices, business partners can continuously monitor transactional anomalies, interact with and refine rules which prevent financial losses. Technical evolution is made possible for support emerging business domains, such as the Internet of Things. Fraud as a Service via microservices also provides a technical evolutionary path forward for monolithic applications in our current BSS landscape.

In an embodiment, a system can comprise a processor and a memory that stores executable instructions that, when executed by the processor facilitate performance of operations. The operations can comprise identifying first incoming transaction data in a transactional processing system, wherein the first incoming transaction data is associated with a first transaction. The operations can also comprise selecting a fraud detection microservice from a group of fraud detection microservices based on a type of the first transaction. The operations can also comprise instantiating the fraud detection microservice in the transactional processing system to monitor the first incoming transaction data for fraud.

In another embodiment, method comprises determining, by a fraud as a service device comprising a processor, that a first data stream comprises first customer interaction data. The method can also comprise selecting, by the fraud as a service device, a first fraud detection microservice from a group of fraud detection microservices based on a type of the first customer interaction data. The method can also comprise facilitating, by the fraud as a service device, implementing the first fraud detection microservice to monitor the first data stream for fraud.

In another embodiment machine-readable storage medium, comprising executable instructions that, when executed by a processor of a device, facilitate performance of operations. The operations can comprise identifying first incoming transaction data and second incoming transaction data in a transactional processing system, wherein the first incoming transaction data is associated with a first transaction type and the second incoming transaction data is associated with a second transaction type. The operations can also comprise selecting a first fraud detection microservice from a group of fraud detection microservices based on the first transaction type. The operations can also comprise selecting a second fraud detection microservice from the group of fraud detection microservices based on the second transaction type. The operations can also comprise instantiating the first fraud detection microservice and the second fraud detection microservice in the transactional processing system to monitor the first incoming transaction data and the second incoming transaction data for fraud.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

FIG. 1 illustrates an example fraud detection microservices system 100 that monitors for fraud in incoming data streams in accordance with various aspects and embodiments of the subject disclosure. In an embodiment, fraud detection microservices 114, 116, and 118 can monitor respective data streams 124, 126, and 128 for fraud before and/or during processing by registration component 104, ordering component 106 and provisioning component 108 of a customer facing application side 102 of an OSS/BSS.

As an example, the customer facing application platform 102 of the OSS/BSS can be as simple an implementation as a website and/or computer system for purchasing goods or services online, or can be a complex platform that integrates many different services for a group of subscribers, customers, and/or clients.

Any customer interaction or transaction with the customer facing application platform 102 of the platform carries with it a risk of fraud or other risk of other illicit activities that if flagged and identified can enable the system to address the fraudulent activities. Many of the different ways in which a customer interacts with the platform 102 can potentially risk a different type of fraud.

For example, upon registration, a client/customer account can be set up with false information, or be a phony account. Similarly, an online order can involve payment details that can be falsified, or belong to an entity other than the person making the order. Because these are different types of fraud, different fraud detection models can be used to identify the cases of fraud, where the different fraud detection models can have different triggers, different rules, different sensitivities and other variables that may be specific to a specific type of fraud.

By having separate fraud detection microservices 114, 116, and 118 instead of a monolithic fraud detection system, the microservices can be updated dynamically, in real time in order to react to changing threat landscapes. For instance, if FDM 114 fails to detect a fraud event associated with incoming registration data for registration component 104, once an operator identifies the fraud, the FDM 114 can be updated quickly and independently of FDM 116 and FDM 118 with new rules to catch the fraud. Similarly, the FDM 114 can use deep learning to change the rules/model based on incoming data, anomalous or otherwise.

A Fraud as a Service (FaaS) system can instantiate one or more of FUM 114, 116, and/or 118 when it detects incoming transaction or interaction data 124, 126, and/or 128. The FDMs 114, 116, and/or 118 can be selected from a group of FDMs based on a type of the transaction data or interaction data. In an embodiment, there may be one or more registration FDMs, and FDM 114 can be selected from one of the registration FDMs. Likewise, there can be one or more ordering FDMs, and FDM 116 can be selected from one of the ordering FDMs. The FaaS can instantiate the microservice operation/logic at or near a part of the processing flow associated with the respective component. The FDMs 114, 116, and/or 118 can be virtual machines or devices instantiated at or near junctions in the business processing flow. The FDMs 114, 116, and/or 118 can be small lightweight objects that can coexist in the channel/process for the customer. The rules in the microservices can be exposed through in a manner and visualized by the business partners to allow them to reach quickly, instantaneously to elaborate or reinforce rules for exploitation.

In certain embodiments, the FDM 114, 116, and/or 118 can detect fraud and develop new rules based on classifications, correlations, inferences and/or expressions associated with principles of artificial intelligence. For instance, the FUM 114, 116, and/or 118 and other classification models, as well as the system components, can employ an automatic classification system and/or an automatic classification process to determine whether data is anomalous or likely to be fraud. In one example, the FDM 114, 116, and/or 118 can employ a probabilistic and/or statistical-based analysis (e.g., factoring into the analysis utilities and costs) to learn and/or generate inferences with respect to the interaction and transaction data and corresponding classifications of fraudulent activities. In an aspect, the FUM 114, 116, and/or 118 can comprise an inference component (not shown) that can further enhance automated aspects of the fraud detection utilizing in part inference based schemes to facilitate learning and/or generating inferences associated with the fraud detection and classification that can be applied in order to increase a classification accuracy. The FDM 114, 116, and/or 118 can employ any suitable machine-learning based techniques, statistical-based techniques, and/or probabilistic-based techniques. For example, the FDM 114, 116, and/or 118 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the FDM 114, 116, and/or 118 can perform a set of machine learning computations associated with classifying fraud. For example, the FDM 114, 116, and/or 118 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to classify and detect fraud and other illicit activities associated with the interaction and transaction data.

It is to be appreciated that the sample components (e.g., registration component 104, ordering component 106, and provisioning component 108) are merely exemplary components in an embodiment of an OSS/BSS customer facing platform 102. In other embodiments, there may be different components and/or functions, with respective fraud detection microservices instantiated in order to detect fraud in one or more data flows.

Figure 2:
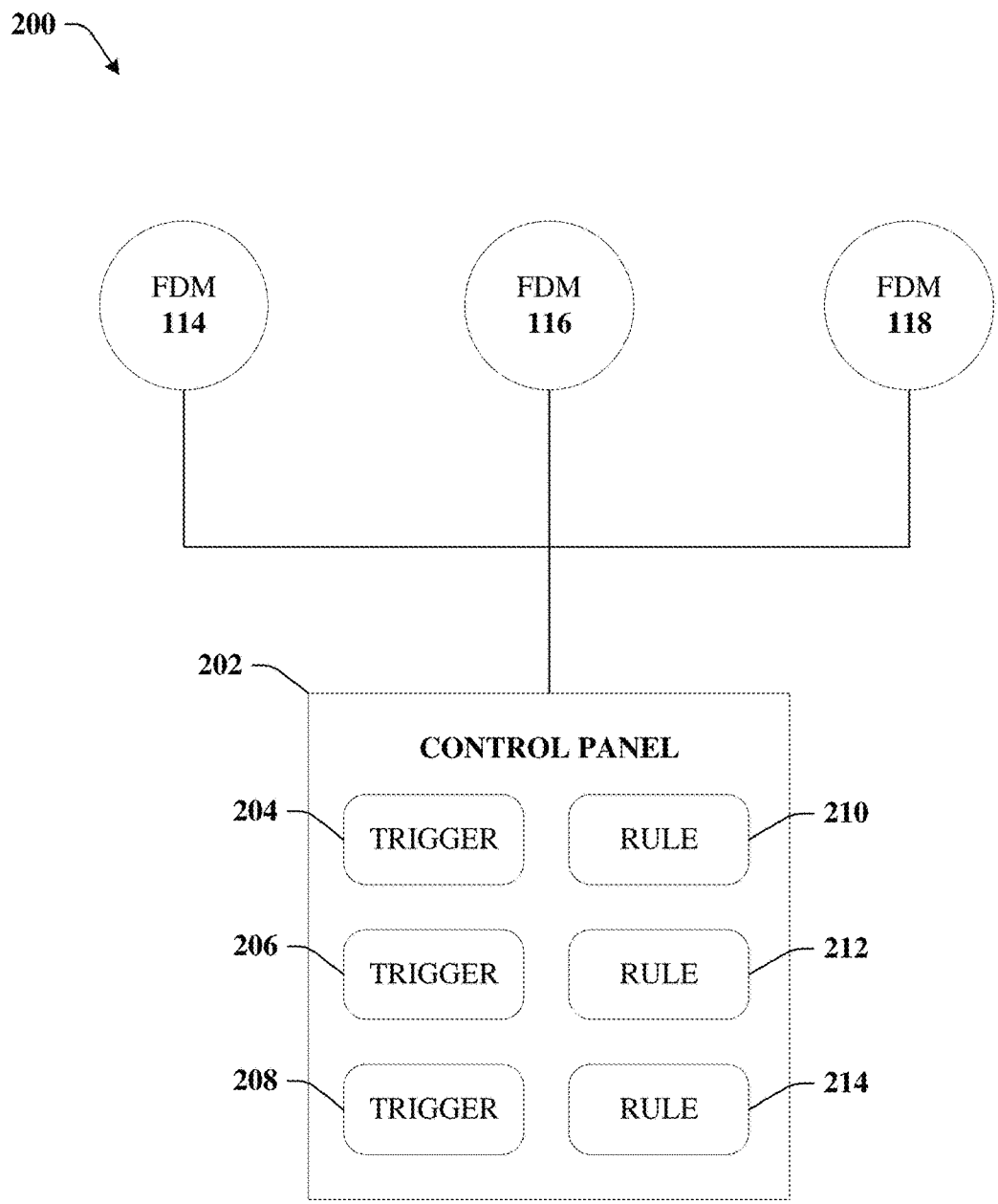
FIG. 2 illustrates an example control panel for a fraud detection microservices system in accordance with various aspects and embodiments of the subject disclosure.

Turning now to FIG. 2, illustrated is an example control panel 202 for a fraud detection microservices system 200 in accordance with various aspects and embodiments of the subject disclosure.

In an embodiment, an operator can access the functionality and configure the FDM 114, 116, and/or 118 via control panel 202. In an embodiment, each FDM can have a separate control panel or control panel tab, or they can be jointly configured via a single interface. The operator can select a new fraud detection model for each FDM, or edit or modify existing FDMs. The control panel 202 can also provide an interface to allow an operator to see what triggers 204, 206, 208 and/or rules 210, 212, and 214 are currently being implemented, or provide a list of such triggers and rules to allow the operator to select one or more of triggers and rules to apply for a particular microservice.

Figure 3:
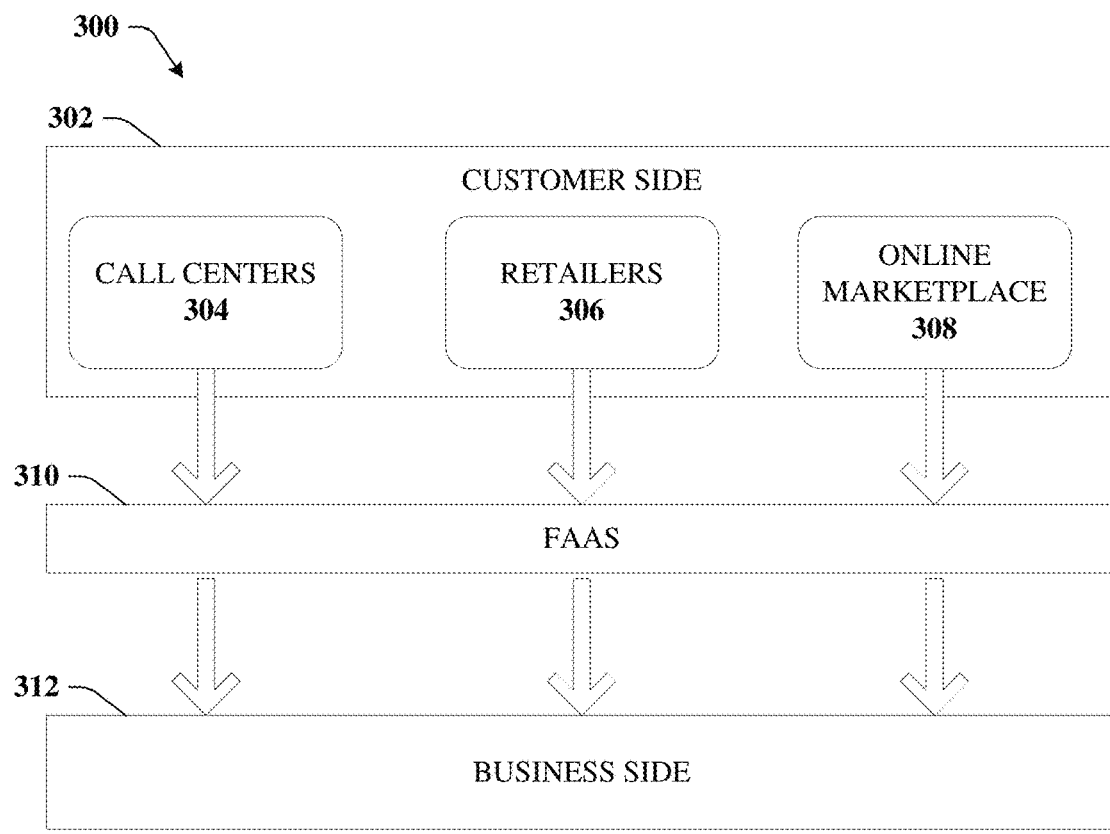
FIG. 3 illustrates an example fraud as a service system in an OSS/BSS in accordance with various aspects and embodiments of the subject disclosure.

The operator can be associated with an operator of the OSS/BSS on which the FDM 114, 116, and/or 118 are operating, or can be associated with a provider of the FaaS system. In some embodiments, an authorized user from the OSS/BSS or the FaaS system can access the control panel, select, change, or modify fraud detection rules, models, triggers, and other variables associated with the FDM 114, 116, and/or 118. It is to be appreciated that there can be a very large number of triggers and rules that correspond to many different contextual processes, data streams and microservices Turning now to FIG. 3, illustrated is an example fraud as a service system 310 in an OSS/BSS 300 in accordance with various aspects and embodiments of the subject disclosure.

In an embodiment, the FaaS system 310 can interface with data coming from a customer side 302 of the OSS/BSS such as from call centers 304, retailers 306, and online marketplaces 308 in order to detect fraud in the customer interaction data and transaction data before passing the data to the business side 312 of the OSS/BSS. It is to be appreciated that while the FaaS 310 is shown as accessing the data before the business side 312 processes the interaction/transaction data, in some embodiments, the FaaS 310 merely passively monitors the interaction/transaction data in parallel as the business side 312 processes orders, updates registrations, manages accounts, and other business processes which may involve fraudulent activities.

In an embodiment, the FaaS platform 310 can be implemented on a mobile network platform or as a module in the core network. Customer interaction and transaction data can be received from one or more mobile devices or other devices connected to the mobile network platform. In this way, the FaaS 310 can identify fraud in not just the application layer (e.g., the content of the transaction and interaction data) but also across the other 6 OSI model layers. Implemented in the mobile network platform in this way, the FaaS platform 310 can have a much broader view of the contextual data, environmental data, and other variables which may enable the FaaS platform 310 to detect fraudulent activities.

In an embodiment, the fraud services of the FaaS platform 310 can access the OSS/BSS services via a Common Corp messaging bus e.g., Dmaap "Data Movement as a Platform" bus) and then seamlessly integrate with an enhanced Control Orchestration Management Policy platform.

In an embodiment, the FaaS platform 310 can facilitate:

Common open-source platform: A set of Microservices providers, inherited from a common light-weight RESTful (JSON for GUI) server platform, each provides a well-defined fraud processing tasks such as Data Preprocessing, Data Sampling, Sorting, Merging, and storing, Data Segmenting, Variable selecting, Clustering, Model-building, Model-refining, Model Selecting, and Regression, Data Visualization, etc.

Dynamical plug-ins: Model-building, Model-refining, Model Selecting etc are dynamically refine themselves according data sets, results, and experts' evaluations and configurations.

Figure 4:
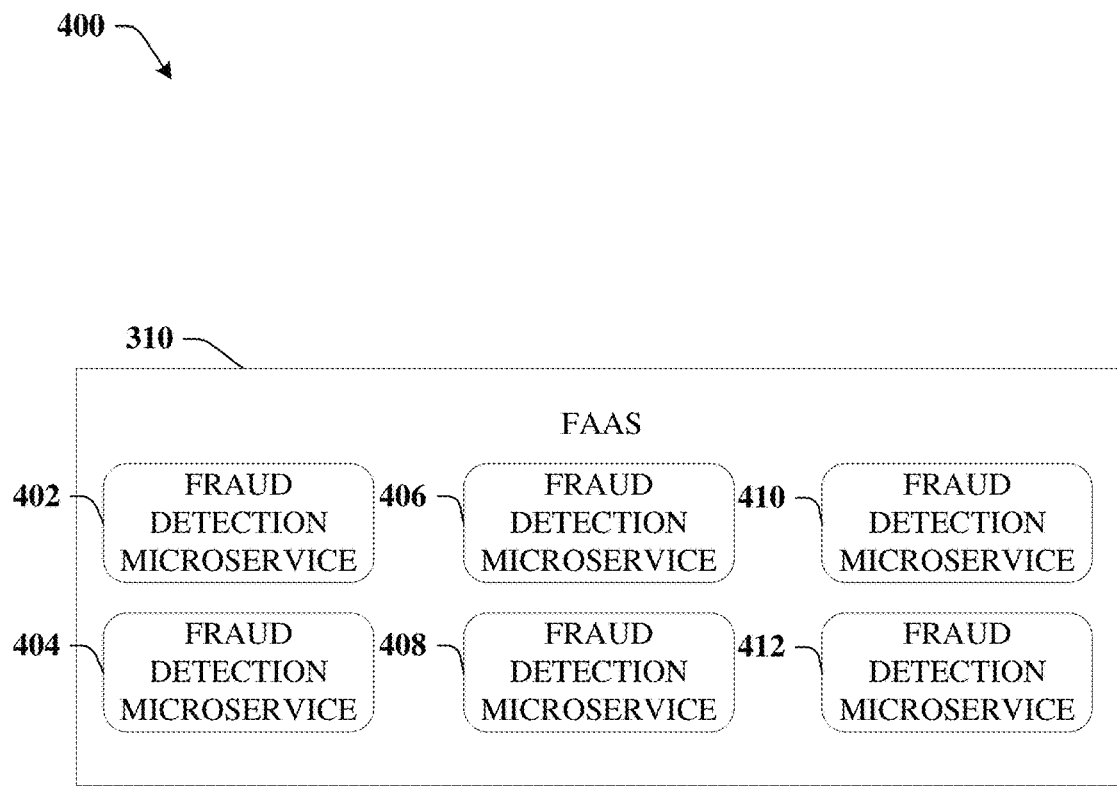
FIG. 4 illustrates an example fraud as a service system in accordance with various aspects and embodiments of the subject disclosure.

Turning now to FIG. 4, illustrated is an example fraud as a service system 400 in accordance with various aspects and embodiments of the subject disclosure. In the embodiment in system 400, the FaaS platform 310 from FIG. 3 can include multiple fraud detection microservices (e.g., FDM 402, 404, 406, 408, 410, and 412). Each of these FDMs can be linked to each other via a bus as described above and can be instantiated such that each FDM can monitor one or more data flows corresponding to different types of interaction and customer data.

In an embodiment, the FaaS platform 310 can initiate FDM 402 when a first data stream corresponding to a type of customer interaction data is received. If a second data stream is received but is associated with the same type of customer interaction data, FDM 402 can handle both customer interaction data and data streams. If a third data stream is received that corresponds to a different type of customer interaction data then the FaaS platform 310 can implement FDM 404 to monitor the third data stream for fraud.

Figure 5:
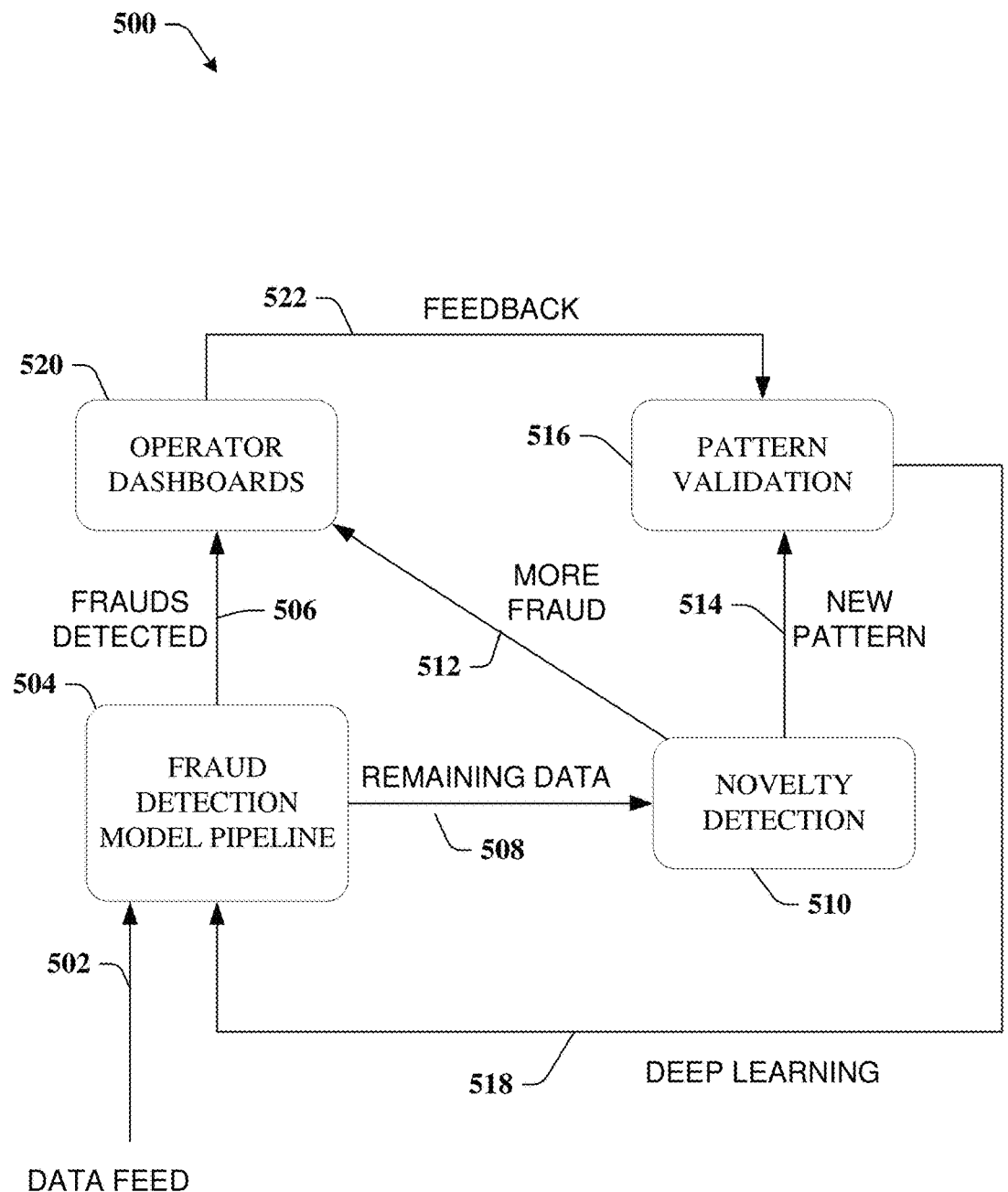
FIG. 5 illustrates an example flowchart for implementing a fraud detection microservice in accordance with various aspects and embodiments of the subject disclosure.

Turning now to FIG. 5, illustrated is an example flowchart 500 for implementing a fraud detection microservice in accordance with various aspects and embodiments of the subject disclosure.

In an embodiment, the process can start at 502 where data is received at a fraud detection model pipeline 504. The data can be received from a device associated with a client/subscriber account or other user information and can be received via a cloud network device or mobile network platform. Data streams of varying content can be received from network resources or mobile network platforms. Data stream content will vary in relation to the context of the desired fraud detection application. Applications are not limited to, but can include: Sales, Credit, Ordering, Provisioning, Mortgage processing, Insurance processing, Medical claims, Warranty claims.

If a fraud is detected at 506 in the fraud detection model pipeline, the operator dashboard 520 can be notified of the fraudulent activity. Otherwise, the remaining data 508 can be forwarded to a novelty detection component 510. Novelty detection provides a configurable second level of detection for sub-threshold detection of transient or emerging fraud patterns 512, which is provided to the operator dashboard 520 for fraud-performance/mitigation. Novelty detection also passes active, successful fraud patterns to the validation interface 516 for operator/analyst confirmation and subsequent rule adaptation. The operator dashboard 520 can also send feedback, e.g., suggestions from an operator, new information about threats, or requests to spend more time analyzing one or more transactions at 522 to the pattern validation component 516. In-stream deep learning capabilities 518 evaluate and correlate overlapping and gaps within the universe of active rules and algorithms, performing a meta-learning process which delivers dynamic recommendations for non-obvious risks.

Figure 6:
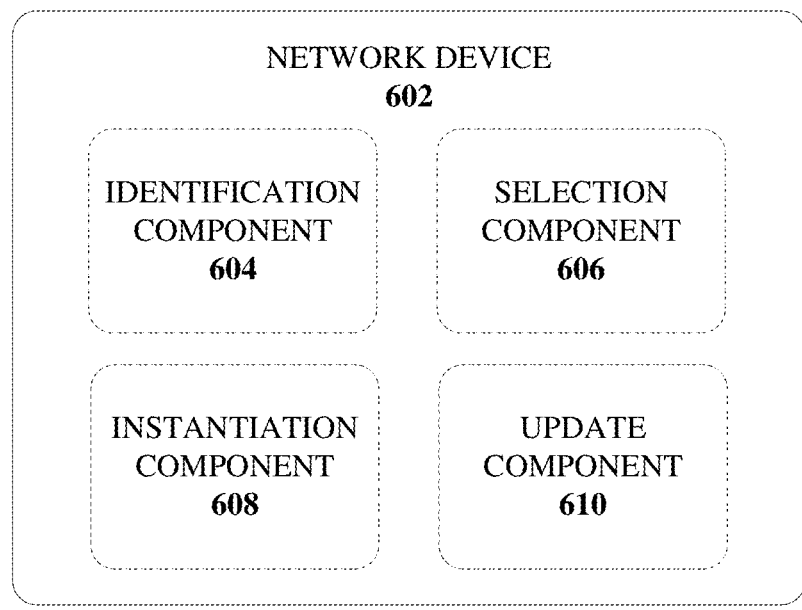
FIG. 6 illustrates an example network device that implements a fraud detection microservice in accordance with various aspects and embodiments of the subject disclosure.

Turning now to FIG. 6, illustrated is an example system 600 that includes a network device 602 that implements a fraud detection microservice in accordance with various aspects and embodiments of the subject disclosure.

An identification component 604 can be provided to identify a first incoming transaction data in a transactional processing system, wherein the first incoming transaction data is associated with a first transaction. In an embodiment, the incoming transaction data can relate to a customer interaction with an OSS/BSS and include details that could be falsified or otherwise manipulated in order to perpetrate fraud. The data can be received via a mobile network platform from a user equipment or mobile device associated with the customer.

A selection component 606 can be provided to select a fraud detection microservice from a group of fraud detection microservices based on a type of the first transaction. The selection component 606 can determine which type of data which type of transaction is related to the incoming transaction data and find a fraud detection microservice that is applicable to that type of data.

The identification component 604 can receive second incoming transaction data associated a second transaction, wherein the second transaction is a same type as the type of the first transaction. Based on that, the selection component 606 can determine that the fraud detection microservice selected for the first incoming data can work for the second incoming data. If third incoming data is received however that relates to a different type of customer transaction data or interaction data, then the selection component 606 can select a second fraud detection microservice to instantiate to detect fraud in the third customer data. The first and second fraud detection microservices can be seeded with one or more fraud detection rules and/or models, and then the fraud detection microservice can add additional models/rules based on machine learning.

An instantiation component 608 can be provided to instantiate the first fraud detection microservice and the second fraud detection microservice in the transactional processing system to monitor the first incoming transaction data for fraud. The instantiation component 608 can instantiate the fraud detection microservice as a virtual machine or in other embodiments can connect a hardware logic circuit comprising the software stored on a memory and processor to execute the software instructions to perform the fraud detection functions. The hardware circuit can be activated whenever the instantiation component 608 determines that a new fraud detection microservice is required.

An update component 610 can receive feedback from an operator and update a fraud detection model or rule in any of the fraud detection microservices active or inactive on the transactional processing system. The new rule or model can be applicable to any immediately subsequent transaction data received. In this way the fraud detection microservices can be updated in real-time and dynamically to adjust to changing threat patterns.

Figure 7:
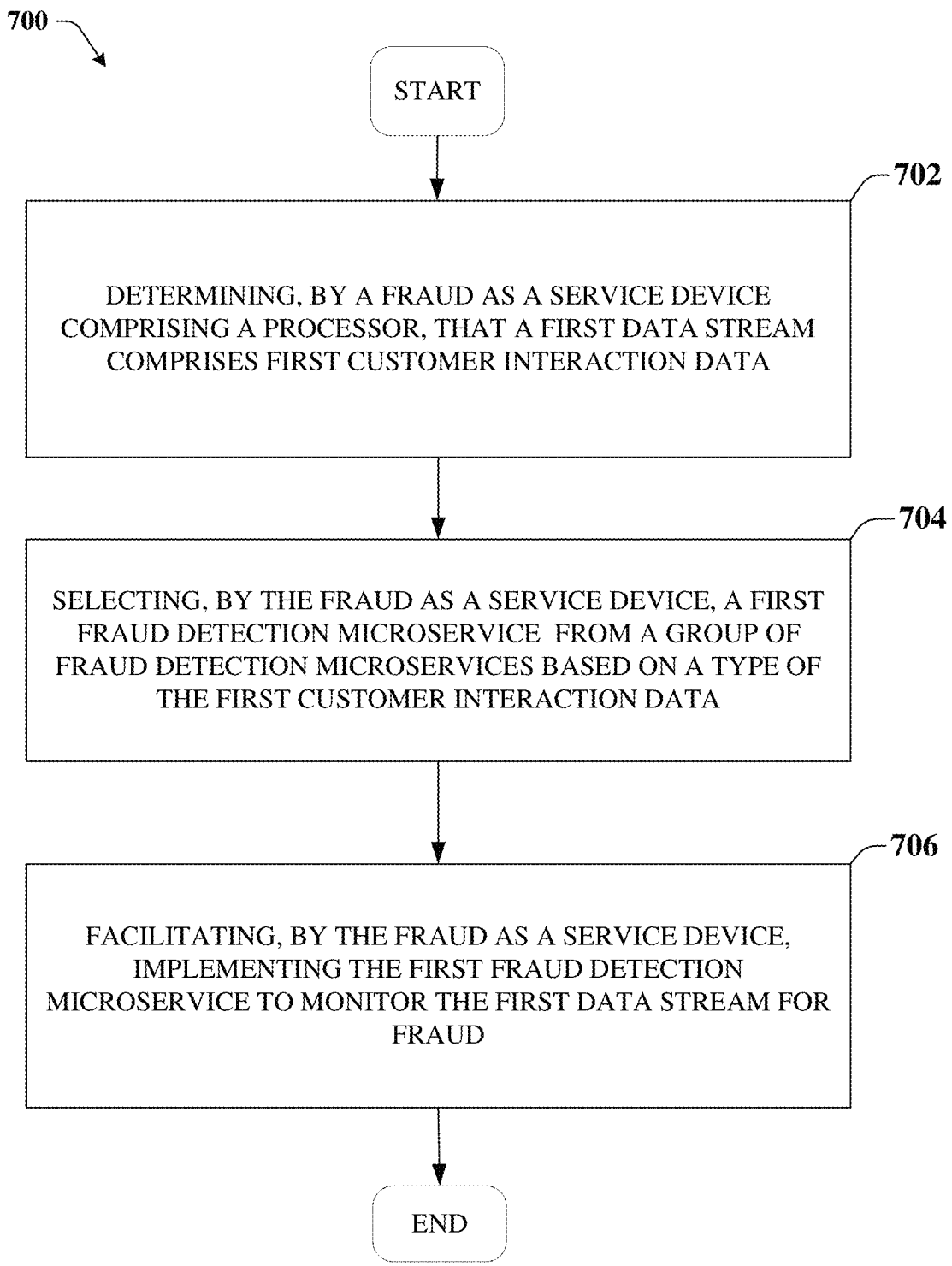
FIG. 7 illustrates an example method for implementing a fraud detection microservice in accordance with various aspects and embodiments of the subject disclosure.
Figure 8:
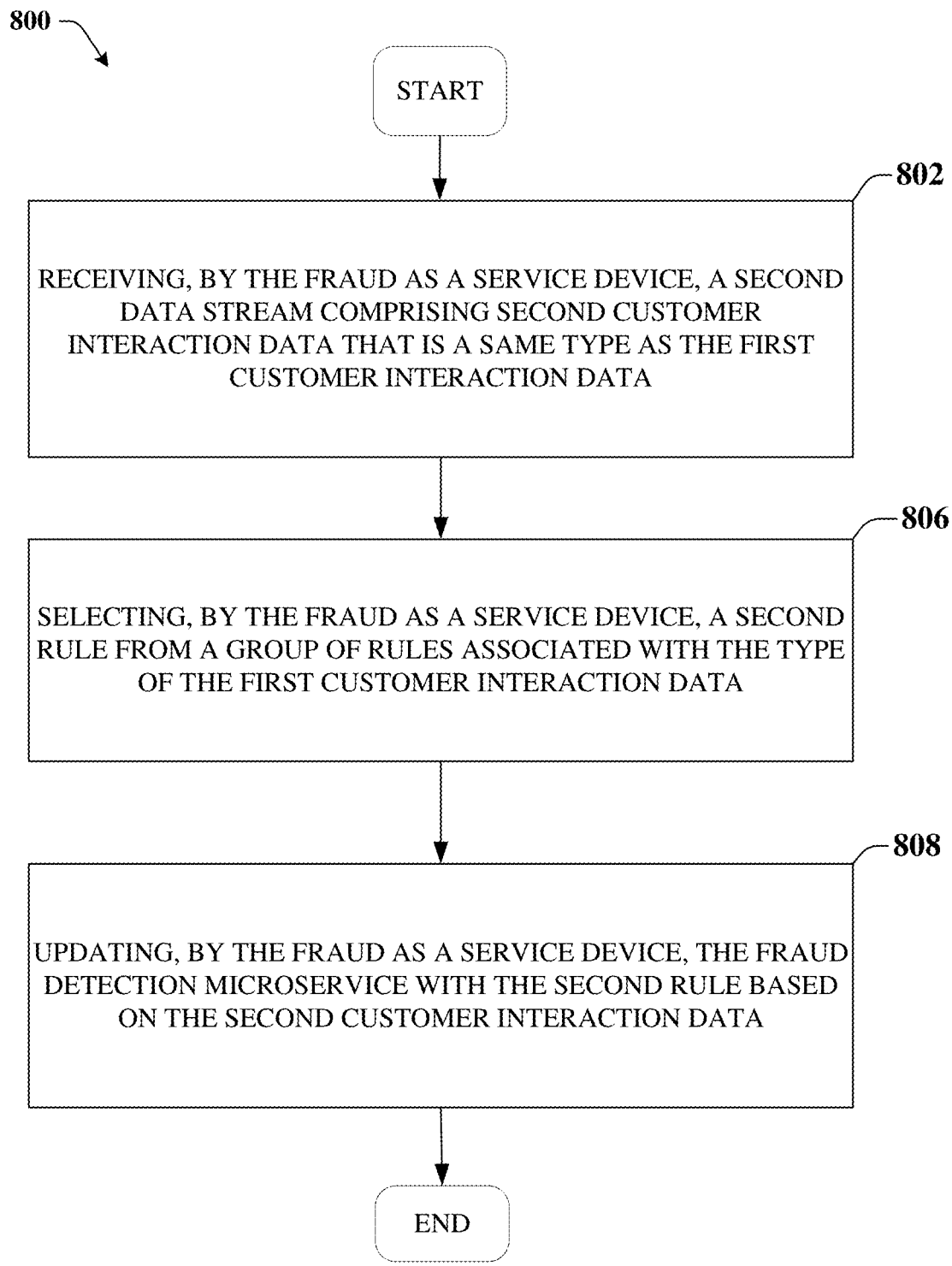
FIG. 8 illustrates an example method for implementing a fraud detection microservice in accordance with various aspects and embodiments of the subject disclosure.
Figure 9:
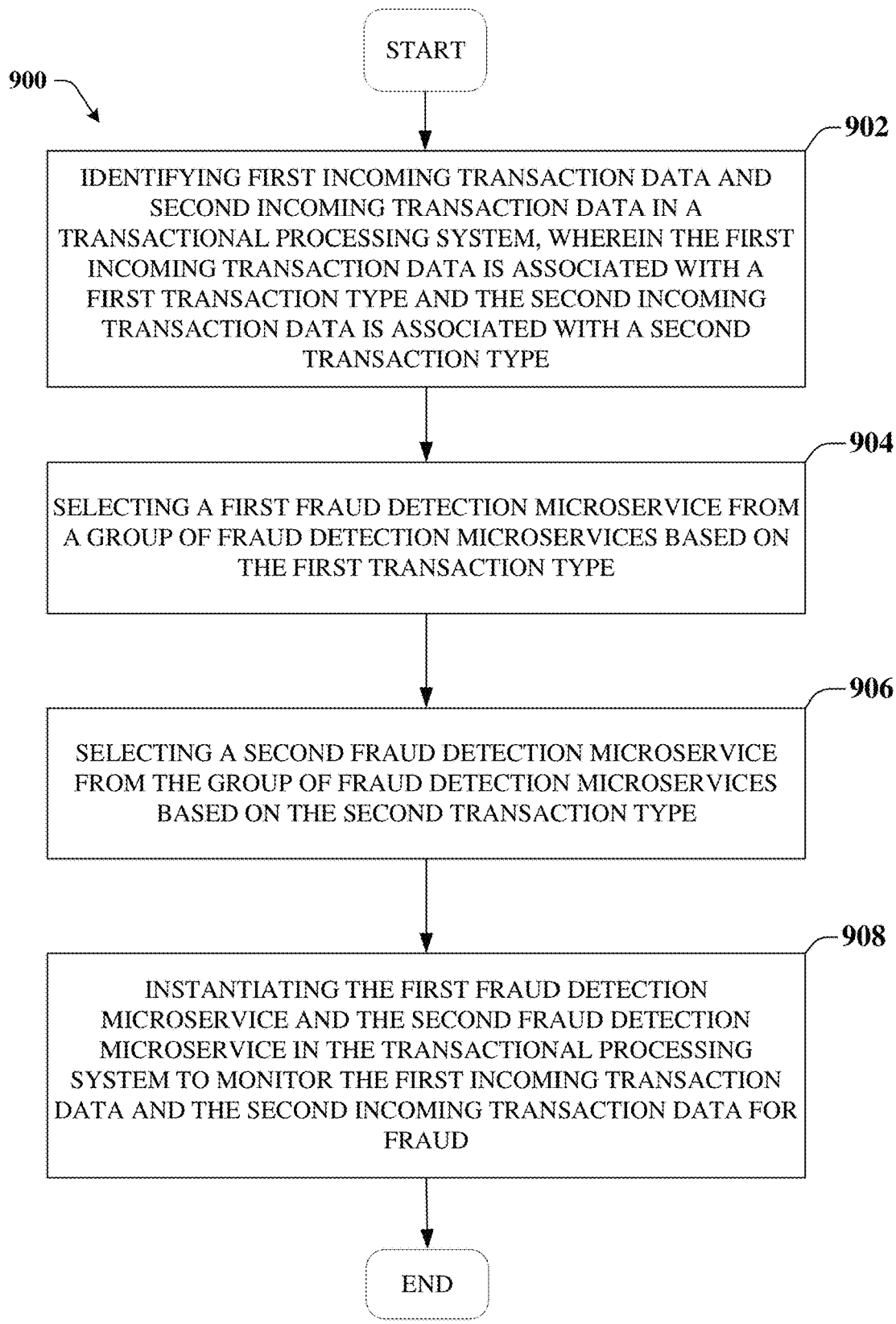
FIG. 9 illustrates an example method for implementing a fraud detection microservice in accordance with various aspects and embodiments of the subject disclosure.

FIGS. 7-9 illustrates a process in connection with the aforementioned systems. The processes in FIGS. 7-9 can be implemented for example by the systems in FIGS. 1-6 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 7 illustrates an example method 700 for implementing a fraud detection microservice in accordance with various aspects and embodiments of the subject disclosure.

Method 700 can begin at 702 where the method includes determining, by a fraud as a service device comprising a processor, that a first data stream comprises first customer interaction data.

At 704, the method includes selecting, by the fraud as a service device, a first fraud detection microservice from a group of fraud detection microservices based on a type of the first customer interaction data.

At 706, the method includes facilitating, by the fraud as a service device, implementing the first fraud detection microservice to monitor the first data stream for fraud.

FIG. 8 illustrates an example method 800 for implementing a fraud detection microservice in accordance with various aspects and embodiments of the subject disclosure.

At 802 the method includes receiving, by the fraud as a service device, a second data stream comprising second customer interaction data that is a same type as the first customer interaction data.

At 804 the method includes selecting, by the fraud as a service device, a second rule from a group of rules associated with the type of the first customer interaction data.

At 806 the method includes updating, by the fraud as a service device, the fraud detection microservice with the second rule based on the second customer interaction data.

FIG. 9 illustrates an example method 900 for implementing a fraud detection microservice in accordance with various aspects and embodiments of the subject disclosure At 902 the method includes identifying first incoming transaction data and second incoming transaction data in a transactional processing system, wherein the first incoming transaction data is associated with a first transaction type and the second incoming transaction data is associated with a second transaction type.

At 904 the method includes selecting a first fraud detection microservice from a group of fraud detection microservices based on the first transaction type.

At 906 the method includes selecting a second fraud detection microservice from the group of fraud detection microservices based on the second transaction type.

At 908 the method includes instantiating the first fraud detection microservice and the second fraud detection microservice in the transactional processing system to monitor the first incoming transaction data and the second incoming transaction data for fraud.

Figure 10:
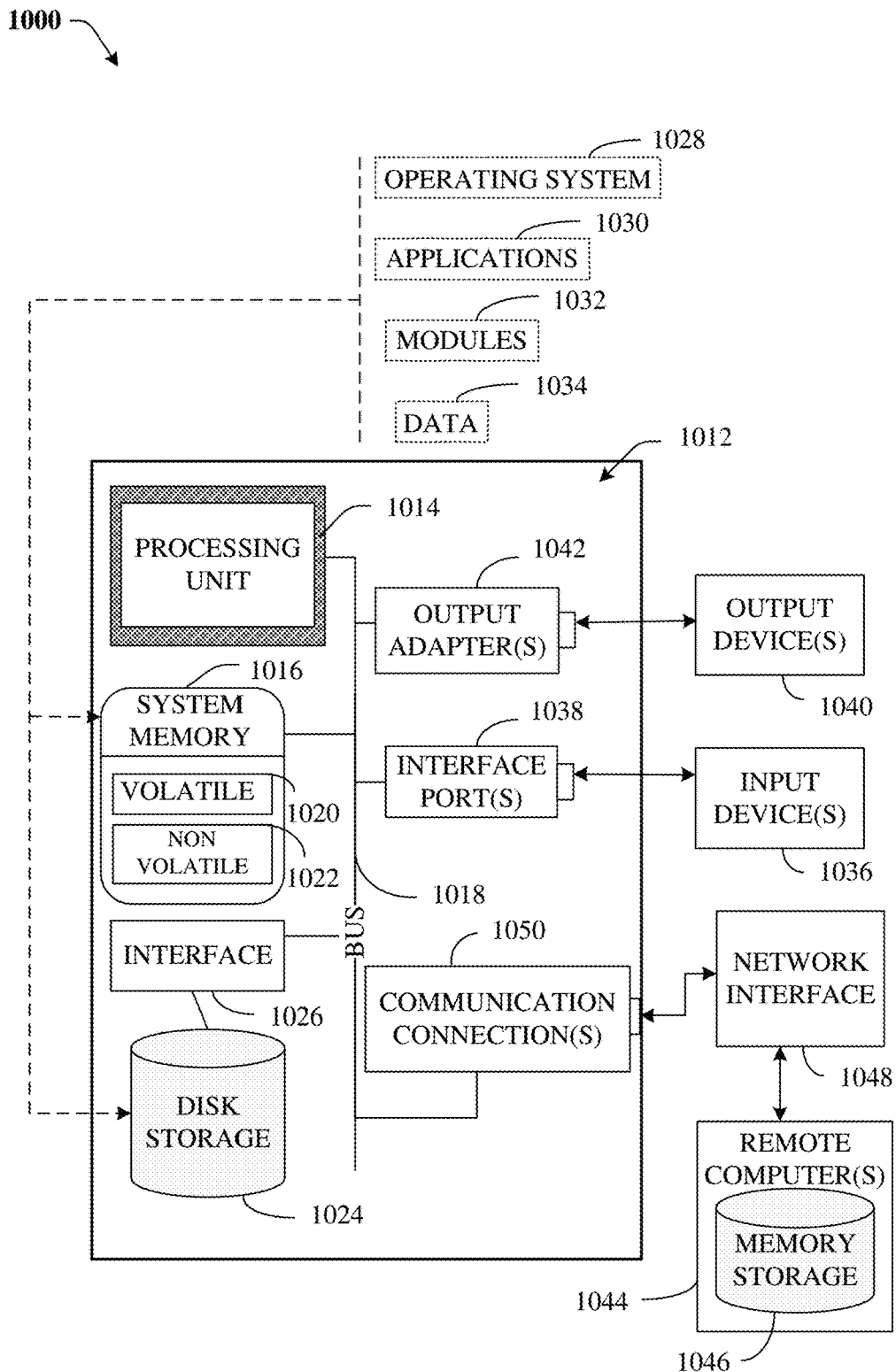
FIG. 10 is a schematic block diagram illustrating a suitable operating environment.

With reference to FIG. 10, a suitable environment 1000 for implementing various aspects of this disclosure includes a computer 1012. The computer 1012 includes a processing unit 1014, a system memory 1016, and a system bus 1018. It is to be appreciated that the computer 1012 can be used in connection with implementing one or more of the Fraud detection microservices, systems or components shown and described in connection with FIGS. 1-6, or otherwise described herein. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 also includes removable/non-removable, volatile/nonvolatile computer storage media. FIG. 10 illustrates, for example, a disk storage 1024. Disk storage 1024 includes, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used, such as interface 1026.

FIG. 10 also depicts software that acts as an intermediary between users and the basic computer resources described in the suitable operating environment 1000. Such software includes, for example, an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored, e.g., in system memory 1016 or on disk storage 1024. It is to be appreciated that this disclosure can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

Figure 11:
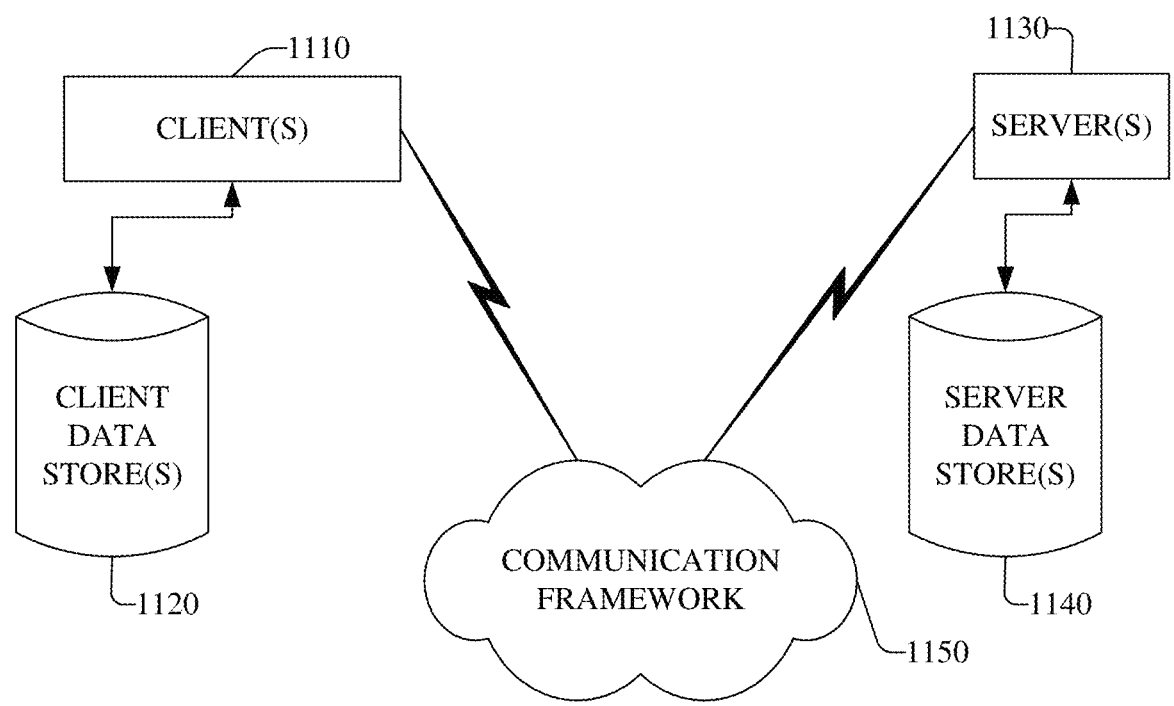
FIG. 11 is a schematic block diagram of a sample-computing environment.

FIG. 11 is a schematic block diagram of a sample-computing environment 1100 (e.g., computing system) with which the subject matter of this disclosure can interact. The system 1100 includes one or more client(s) 1110. The client(s) 1110 can be hardware and/or software (e.g., threads, processes, computing devices). The system 1100 also includes one or more server(s) 1130. Thus, system 1100 can correspond to a two-tier client server model or a multi-tier model (e.g., client, middle tier server, data server), amongst other models. The server(s) 1130 can also be hardware and/or software (e.g., threads, processes, computing devices). The servers 1130 can house threads to perform transformations by employing this disclosure, for example. One possible communication between a client 1110 and a server 1130 may be in the form of a data packet transmitted between two or more computer processes.

The system 1100 includes a communication framework 1150 that can be employed to facilitate communications between the client(s) 1110 and the server(s) 1130. The client(s) 1110 are operatively connected to one or more client data store(s) 1120 that can be employed to store information local to the client(s) 1110. Similarly, the server(s) 1130 are operatively connected to one or more server data store(s) 1140 that can be employed to store information local to the servers 1130.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
a processor; and
a memory that stores executable instructions that, when executed by the processor, facilitate performance of operations, comprising:
identifying first incoming transaction data in a transactional processing system, wherein the first incoming transaction data is associated with a first transaction;
in response to identifying the first incoming transaction data, determining, via a selection interface, a fraud detection microservice from a group of fraud detection microservices, hosted at server equipment, that is applicable to the incoming transaction data;
interfacing with the transaction data prior to receiving a registration update from a registration component on the system;
in response to interfacing with the transaction data, processing the first incoming transaction;
selecting, via a control panel interface, the fraud detection microservice based on a type of the first transaction;
instantiating the fraud detection microservice, at the registration component, as a virtual machine in the transactional processing system to monitor the first incoming transaction data for fraud;
in response to instantiating the fraud detection microservice, performing a clustering machine learning computation, a logistic regression machine learning computation, and a regression tree machine learning computation, resulting in clustered machine learning computations that have been performed by server equipment;
based on the clustered machine learning computations, determining that the fraud detection microservice has failed to detect a fraud event associated with a registration associated with the first transaction; and
in response to the determining that the fraud detection microservice has failed to detect the fraud event and based on an inference generated by artificial intelligence, updating the fraud detection microservice with a rule to mitigate the fraud event, wherein updating the fraud detection microservice comprises utilizing a machine-learning protocol to modify the rule to be applied to a second transaction, wherein updating the fraud detection microservice comprises utilizing a classification process to determine that the second transaction is likely to be the fraud event, and wherein updating the fraud detection microservice is performed independently of the group of fraud detection microservices.

2. The system of claim 1, wherein the operations further comprise:
sending the fraud detection microservice with the rule based on the type of the first transaction.

3. The system of claim 2, wherein the operations further comprise:
receiving second incoming transaction data associated the second transaction, wherein the second transaction is a same type as the type of the first transaction.

4. The system of claim 3, wherein the operations further comprise:
adding a second rule based on the second incoming transaction data.

5. The system of claim 4, wherein the operations further comprise:
selecting the second rule from a group of rules associated with the type of the first transaction.

6. The system of claim 1, wherein the first transaction is associated with a client identity of the transactional processing system.

7. The system of claim 1, wherein the operations further comprise:
receiving third incoming transaction data associated a third transaction, wherein the third transaction is a second type of transaction.

8. The system of claim 7, wherein the fraud detection microservice is a first fraud detection microservice, and wherein the operations further comprise:
selecting a second fraud detection microservice from the group of fraud detection microservices based on the second type of transaction; and
instantiating the second fraud detection microservice in the transactional processing system to monitor the third incoming transaction data for fraud.

9. The system of claim 1, wherein there is a different fraud detection microservice instantiated for each type of incoming transaction data.

10. The system of claim 1, wherein the operations further comprise:
receiving a new rule from an operator; and
implementing the new rule for subsequent incoming transaction data received after the first incoming transaction data.

11. The system of claim 1, wherein first transaction comprises an interaction between a equipment associated with a client account and the transactional processing system.

12. A method, comprising:
determining, by fraud as a service equipment comprising a processor, that a first data stream comprises first customer interaction data;
in response to determining that the first data stream comprises the first customer interaction data, determining, by the fraud as the service equipment, a first fraud detection microservice from a group of fraud detection microservices, hosted at server equipment, that is applicable to the first data stream;
selecting, by a control panel interface of the fraud as service equipment, the first fraud detection microservice based on a type of the first customer interaction data;
analyzing, by the fraud as the service equipment, the first data stream prior to receiving registration update data from a registration component;
in response to analyzing the first data stream, processing, by the fraud as the service equipment, the first customer interaction data;
initiating, by the fraud as the service equipment, the first fraud detection microservice, at the registration component, as a virtual machine to monitor the first data stream for fraud;
in response to instantiating the fraud detection microservice, performing, by the fraud as the service equipment, a clustering machine learning computation, a logistic regression machine learning computation, and a regression tree machine learning computation, resulting in clustered machine learning computations that have been performed by the server equipment;

based on the clustered machine learning computations, determining, by the fraud as the service equipment, that the first fraud detection microservice has failed to detect a fraudulent activity; and based on the determining that the first fraud detection microservice has failed to detect the fraudulent activity and based on an inference generated by artificial intelligence, utilizing, by the fraud as the service equipment, a machine-learning protocol to modify a rule to detect the fraudulent activity to be applied to a second data stream, wherein utilizing the machine-learning protocol comprises utilizing a classification process to determine that the second data stream is likely to be the fraudulent activity, and wherein utilizing the machine-learning protocol is performed independently of the group of fraud detection microservices.

13. The method of claim 12, wherein the fraud detection microservice comprises a first rule based on the type of the first customer interaction data.

14. The method of claim 12, further comprising:
receiving, by the fraud as the service equipment, the second data stream comprising second customer interaction data that is a same type as the first customer interaction data;
selecting, by the fraud as the service equipment, a second rule from a group of rules associated with the type of the first customer interaction data; and
updating, by the fraud as the service equipment, the fraud detection microservice with the second rule based on the second customer interaction data.

15. The method of claim 12, further comprising:
receiving, by the fraud as the service equipment, a third data stream that comprises third customer interaction data that is associated with a different type of interaction data than the first customer interaction data.

16. The method of claim 15, further comprising:
selecting, by the fraud as the service equipment, a second fraud detection microservice from the group of fraud detection microservices based on the different type of interaction data.

17. The method of claim 16, further comprising:
facilitating, by the fraud as the service equipment, implementing the second fraud detection microservice to monitor a third incoming transaction data for fraud.

18. A non-transitory machine-readable medium, comprising executable instructions that, when executed by a processor of a device, facilitate performance of operations, comprising:
identifying first incoming transaction data and second incoming transaction data in a transactional processing system, wherein the first incoming transaction data is associated with a first transaction type and the second incoming transaction data is associated with a second transaction type;
interfacing with the first incoming transaction data prior to receiving a registration update from a registration component;

in response to interfacing with the first incoming transaction data, processing the first incoming transaction data;

in response to identifying the first incoming transaction data, determining, a first fraud detection microservice from a group of fraud detection microservices, hosted at server equipment, that is applicable to the first incoming transaction data;

selecting, via a control panel interface, the first fraud detection microservice based on the first transaction type;

in response to instantiating the first fraud detection microservice, performing a group of clustering machine learning computations, a group of logistic regression machine learning computations, and a group of regression tree machine learning computations, resulting in clustered machine learning computations that have been performed by the server equipment;

based on the clustered machine learning computations, determining that the first fraud detection microservice has failed to identify a fraudulent activity;

based on the determining that the first fraud detection microservice has failed to identify the fraudulent activity and based on an inference generated by artificial intelligence, utilizing machine-learning to update a second fraud detection microservice with a fraud detection rule to be applied to the second transaction type, wherein utilizing the machine-learning comprises utilizing a classification process to determine that the second incoming transaction is likely to be fraud, and wherein utilizing the machine-learning is performed independently of the group of fraud detection microservices;

selecting the second fraud detection microservice from the group of fraud detection microservices based on the second transaction type; and instantiating, at the registration component, the first fraud detection microservice as a virtual machine and the second fraud detection microservice in the transactional processing system to monitor the first incoming transaction data and the second incoming transaction data for the fraud.

19. The non-transitory machine-readable medium of claim 18, wherein the operations further comprise:
receiving third incoming transaction data associated with the first transaction type; and
adding an additional fraud detection rule to the first fraud detection microservice based on the third incoming transaction data.

20. The non-transitory machine-readable medium of claim 18, wherein the operations further comprise:
receiving an additional fraud detection rule for the second fraud detection microservice from an operator; and
implementing the additional fraud detection rule for subsequent incoming transaction data received after the third incoming transaction data.

\* \* \* \* \*